United States Patent Office 3,444,094
Patented May 13, 1969

3,444,094
SCINTILLATOR LIQUID
Boris Mordukhovich Krasovitsky, Prospect Lenina 31a, kv. 11; Vladimir Fedorovich Poduzhailo, Prospect Lenina 25, kv. 13; Liya Mikhailovna Podgornaya, Ulitsa Artema 6, kv. 24, all of Kharkov, U.S.S.R.; and Rafail Lvovich Globus, Ulitsa Sovetskaya 8, kv. 44, Moscow, U.S.S.R.
No Drawing. Filed June 14, 1966, Ser. No. 557,394
Int. Cl. C09k 1/02
U.S. Cl. 252—301.2    5 Claims

ABSTRACT OF THE DISCLOSURE

New liquid scintillators which have high scintillation efficiency and high boiling point and are non-flammable. The new scintillators consist essentially of oxazoles and/or 1,3,4-oxadiazoles in purified ditolylmethane.

---

This invention relates to liquid scintillators of high efficiency.

The predominant primary scintillant presenty used for preparing liquid scintillators is toluene which boils at 111° C., possesses significant volatility, and presents fire hazards.

Alpha-methylnaphthalene, which has been proposed as a primary scintillant, has low volatility, but is expensive. This refers particularly to the pure-grade material required for the preparation of scintillation grade alpha-methylnaphthalene.

It is an object of the present invention to provide a liquid scintillator from non-flammable starting materials having a high boiling point and low volatility.

Another object of the invention is to provide a liquid scintillator featuring high optical transparency.

Still another object of the invention is to provide a liquid scintillator from readily available and inexpensive starting materials.

According to the present invention these objects are accomplished by using as the starting primary scintillant ditolylmethane containing various scintillation activators, preferably the oxazole and 1,3,4-oxadiazole derivatives. Thus, for instance, use is made of such activators as 2 - phenyl-5-biphenylyl - 1,3,4-oxadiozole, 2,5 - diphenyloxazole and 1,4,di-[2-(2,5-phenyloxazolyl)]-benzene. To enhance the scintillation efficiency and optical transparency of the proposed scintillators, ditholylmethane, which is produced on a multition scale (mixture of isomers), is preliminarily subjected to purification by repeated treatment with sulfuric acid and then alumina, followed by distillation over metallic calcium in vacuum.

Ditolymethane is a cheaper solvent than the above-mentioned alpha-methylnaphthalene.

The primary scintillant of the present invention boils at a high temperature (about 280° C.) and displays low volatility.

The use of ditolylmethane as the primary scintillant for liquid scintillators makes it possible to prepare scintillators featuring various desirable properties depending upon the activators employed. Thus, solutions of 2-phenyl-5-biphenylyl-1,3,4-oxadiazole in ditolylmethane exhibit a very high scintillation efficiency, while the incorporation of 2,5-diphenyloxazole with or without a wavelength shifter, viz., 1,4-di-[2-(5-phenyloxazolyl)]-benzene, into ditolylmethane yields liquid scintillators which combine adequate scintillation efficiency with high optical transparency.

For a better understanding of the present invention by those skilled in the art, the following examples embodying the invention are presented.

EXAMPLE 1

One liter of technical-grade ditolylmethane is purified by treating same with 100 ml. of sulfuric acid for 20 minutes, while stirring vigorously, and then separating sulfuric acid layer; the treatment of ditolylmethane with sulfuric acid is repeated twice more as described hereinabove. Next, the purified ditolylmethane is treated with 50 g. of alumina, separated therefrom and distilled over metallic calcium at a pressure of 10 mm. Hg.

EXAMPLE 2

Ditolylmethane, purified as described in Example 1, (scintillation grade ditoylmethane) is heated to a temperature of 50° C. and the activator, 2-phenyl-5-biphenylyl-1,3,4-oxadiazole, is introduced into it in an amount of 8 g. per liter. When cooled to room temperature, the solution thus obtained has a scintillation efficiency (as measured by the total integrated photoelectric current) of 160 percent of the standard scintillator, viz., 4 g./l. of p-terphenyl and 0.1 g./l. of 1,4-di[2-(5-phenyloxazolyl)]-benzene in toluene.

EXAMPLE 3

5 g. of 2,5-diphenyloxazole are dissolved in 1 liter of scintillation grade ditolylmethane following the procedure of Example 2. The solution obtained has a scintillation efficiency of 125 percent of the standard scintillator. Maximum luminescence is at 365 m$\mu$, while optical transparency in the 390 m$\mu$ region amounts to 96 percent and that in the 400 m$\mu$ region to approximately 100 percent in relation to the bidistillate.

EXAMPLE 4

A mixture of 5 g. of 2,5-diphenyloxazole and 0.1 g. of 1,4-di-[2-(5-phenyloxazolyl)]-benzene is dissolved in one liter of scintillation grade ditolylmethane. The solution thus obtained has a scintillation efficiency of 135 percent of the standard scintillator. Maximum luminescence is at 420 m$\mu$, while optical transparency in the 420 m$\mu$ region amounts to 92 percent and that in the 430 m$\mu$ region to approximately 100 percent in relation to the bidistillate.

Although the present invention has been described in in accordance with a preferred embodiment, various charges and modifications may be made in carrying out the present invention without departing from the spirit and scope thereof as will be understood by those skilled in the art. These changes and modifications are to be considered as falling within the spirit and scope of the invention as defined in the appended claims.

What we claim is:

1. A liquid scintillator consisting essentially of a solution of at least one scintillation activitor selected from the group consisting of oxazole and 1,3,4-oxadiazole derivatives in ditolylmethane.

2. A liquid scintillator consisting essentially of a solution of at least one scintillation activator selected from the group consisting of oxazole and 1,3,4-oxadiazole derivatives in ditolylmethane, said ditolylmethane being preliminarily purified by repeated treatment with sulfuric acid and then alumina, followed by distillation over metallic calcium in vacuum.

3. A liquid scintillator consisting essentially of a solution of 2-phenyl-5-biphenylyl-1,3,4-oxadiazole in ditolylmethane.

4. A liquid scintillator consisting esentially of a solution of 2,5-diphenyloxazole in ditolylmethane.

5. A liquid scintillator consisting essentially of a solution of 2,5-diphenyloxazole and 1-4-di-[2-(5-phenyloxazolyl)]-benzene in ditolylmethane.

References Cited

UNITED STATES PATENTS

| | | | |
|---|---|---|---|
| 3,010,908 | 11/1961 | Broderick et al. | 252—408 XR |
| 2,985,593 | 5/1961 | Broderick et al. | 252—408 XR |
| 3,170,884 | 2/1965 | Macklin | 252—408 XR |

MAYER WEINBLATT, *Primary Examiner.*

U.S. Cl. X.R.

250—83; 252—408